(12) United States Patent
Watanabe et al.

(10) Patent No.: US 6,356,671 B1
(45) Date of Patent: *Mar. 12, 2002

(54) IMAGE PROCESSING METHOD FOR AN INDUSTRIAL VISUAL SENSOR

(75) Inventors: Atsushi Watanabe; Fumikazu Terawaki; Hiroshi Katsuhisa, all of Oshino-mura (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 137 days.

(21) Appl. No.: 08/954,558

(22) Filed: Oct. 20, 1997

Related U.S. Application Data

(63) Continuation of application No. 08/374,995, filed on Jan. 18, 1995, now abandoned, which is a continuation of application No. 08/027,158, filed as application No. PCT/JP92/00853 on Jul. 6, 1992, now abandoned.

(30) Foreign Application Priority Data

Jul. 5, 1991 (JP) .............................................. 3-191291

(51) Int. Cl.$^7$ ................................................. G06K 9/03
(52) U.S. Cl. .......................... 382/309; 382/305; 714/25
(58) Field of Search ................................. 382/305, 306, 382/309, 258, 190, 201, 312, 153; 358/403; 714/25, 46

(56) References Cited

U.S. PATENT DOCUMENTS

| | | | |
|---|---|---|---|
| 4,817,050 A | * 3/1989 | Komatsu et al. | ............ 358/403 |
| 4,984,279 A | * 1/1991 | Kidney et al. | ............... 358/450 |
| 5,027,420 A | * 6/1991 | Takebayashi | ................. 382/38 |
| 5,066,902 A | * 11/1991 | Watanabe | .............. 318/568.16 |
| 5,121,444 A | * 6/1992 | Takizawa et al. | ............. 382/30 |
| 5,172,245 A | * 12/1992 | Kita et al. | ................... 358/403 |
| 5,175,593 A | 12/1992 | Kumagai et al. | ............. 356/71 |

FOREIGN PATENT DOCUMENTS

| | | |
|---|---|---|
| JP | 56-72771 | 6/1981 |
| JP | 58-115700 | 7/1983 |
| JP | 60-204183 | 10/1985 |

OTHER PUBLICATIONS substantive emamination report in EP 92914391.5, dated Mar. 18, 1997.

* cited by examiner

Primary Examiner—Matthew C. Bella
(74) Attorney, Agent, or Firm—Staas & Halsey LLP

(57) ABSTRACT

An image processing method for improving the reliability of an industrial visual sensor, in which image data picked up by a camera of the visual sensor are marked with flags such as data for specifying the image data or a detected value for the image data, program name, calibration data, correction data, etc., and are stored in an auxiliary storage device. After a production line is stopped, the image data having so far been stored in the auxiliary storage device are successively invoked to a frame memory of the visual sensor in accordance with the flags. An image processing program is reproductively executed for the invoked image data. Then, established teaching data are checked for reliability, and the cause of a failure in image data detection, if any, is examined, with reference to the information displayed on a monitor screen.

14 Claims, 2 Drawing Sheets

IMAGE PROCESSING METHOD FOR AN INDUSTRIAL VISUAL SENSOR

This application is a continuation of application Ser. No. 08/374,995, filed on Jan. 18, 1995, now abandoned, which is a Continuation of prior application Ser. No. 08/027,158, filed Mar. 2, 1993, now abandoned, which is the U.S. National stage of PCT/JP92/00853, filed Jul. 6, 1992.

BACKGROUND OF THE INVENTION

1. Field of the Invention

The present invention relates to an image processing method for a visual sensor for object recognition which is utilized as a visual organ of an industrial robot or the like.

2. Description of the Related Art

In conventional practices, a visual sensor is incorporated in a production line, and the respective positions and attitudes of objects to be detected, which are successively fed onto the production line, are detected in succession by means of the visual sensor. The detected data are transformed into the data for the coordinate system of a machine, such as a robot, and are transmitted as correction data to the robot or other machine. Then, the operation of the robot or the machine is corrected in accordance with the received correction data.

In order to obtain the correction data, according to a system utilizing the visual sensor arranged in the above-described manner, teaching data are needed in order to process an image photographed by a camera, identify the object and detect the position and attitude thereof. In such a conventional method, however, these teaching data used to be set by detecting the value of a parameter for adjustment from one image (sample) of the object.

It is impossible, however, to check if the teaching data obtained in the aforesaid manner represent the average data of the detected objects which have been successively fed to the production line. In some cases, if the objects successively delivered to the production line are subject to change with the passage of time, the current teaching data has to be modified to cope with such a situation. For example, when the teaching data for detecting a hole in a component is obtained from a sample, those components which are successively fed to the line may have a little oil sticking to their holes from a certain point of time and on. In such a case, this teaching data is no longer proper for the detection of those holes, thus requiring a modification.

Thus, in order to evaluate whether or not the teaching data once established suits the present situation, or in order to modify the teaching data for higher reliability, it is necessary to review as many previously processed image data as possible. The storage capacity of a frame memory of the visual sensor is extremely limited, so that as many image data as necessary cannot be stored and retained under normal conditions. More specifically, an image photographed by the camera in response to a snap command is stored in the image memory (frame memory) after undergoing the processing for the gray scale shading by means of an image processor. Normally, a gray scale image in the frame memory has a capacity of 256×256×1 bytes, and the number of image data the frame memory can store ranges from about 4 to 20 on account of restrictions on the part of the hardware.

When unsuccessful processing such as a failure in detection or wrong detection has occurred, the resulting defective image must be investigated to determine the cause of the failure. Since the conventional visual sensor has no means for storing or retaining the defective image, in order to determine the cause of such failure, the current operation has to be interrupted in order to pick up again the object viewed by the camera.

SUMMARY

An object of the present invention is to provide an image processing method for an industrial visual sensor, capable of obtaining proper teaching data based on a number of past image data and examining the cause of unsuccessful processing, if any, after operation is finished.

In order to achieve the above object, according to the present invention, a frame memory is loaded with image data of an object of detection photographed by a camera; the image data are then read from the frame memory; identification data are annexed to the read data; and the resulting data are transferred to and stored in an auxiliary storage device. In examining the image data, the image data stored in the auxiliary storage device are restored from the auxiliary storage device to the frame memory, and the display of the restored image data and an image processing program are reproductively executed with reference to relevant data annexed to the image data.

Preferably, the identification data include at least one of the following: data for specifying the image data or a detected value for the image data, program name, calibration data, correction data, and the like; when the visual sensor includes a plurality of cameras, identification data of a camera used to fetch the image concerned is annexed to the aforesaid identification data; furthermore identification data indicative of unsuccessful processing, such as a failure in detection, if any, is annexed to the identification data.

Preferably, a large-capacity storage device, such as an optical disk, photomagnetic disk, hard disk, cassette streamer or DAT, is used as the auxiliary storage device.

Preferably, of those image data stored in the frame memory, all those of unsuccessful detection are transferred to the auxiliary storage device for storage, while only some of the normally detected image data are selectively transferred and stored according to a predetermined basis.

According to the present invention, as described above, the auxiliary storage device is attached to the industrial visual sensor so that each image data photographed by the camera and stored in the frame memory are annexed with necessary identification data, and are transferred to the auxiliary storage device to be stored and retained therein. In determining or examining whether initially established teaching data is appropriate or not, or in investigating the cause of unsuccessful processing, if any, after the end of the operation, the image data saved in the auxiliary storage device are transferred individually to the frame memory, and the past image processing program is reproductively executed. Thus, a number of image data processed before the production line is stopped can be saved and reproduced, so that the reliability of the established teaching data can be evaluated afterward. Thus, in further executing the image processing after this point, whether the currently established teaching data should be modified or not can be determined, and, moreover, the propriety of the result of actual modification can be examined by using the saved image data. Also, detection failure of the visual sensor can be reproduced afterward without stopping the production line on the spot, thereby enabling the necessary improvement of the visual sensor system for a higher operating efficiency.

DETAILED DESCRIPTION OF THE PREFERRED EMBODIMENTS

Figure 1:
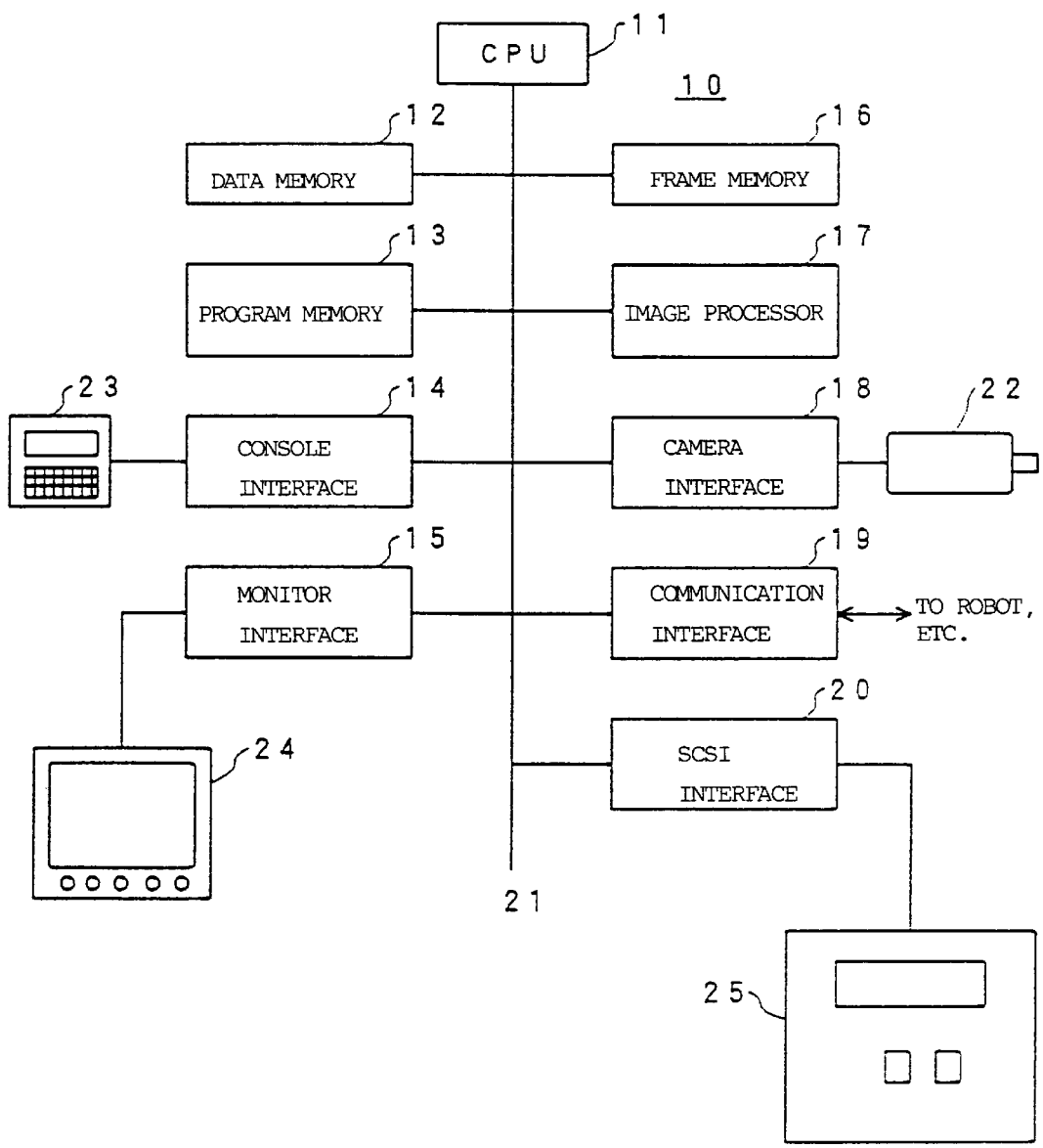
FIG. 1 is a block diagram of a visual sensor for carrying out one embodiment of a method of the present invention.

FIG. 1 is a block diagram showing the principal part of a visual sensor for carrying out a method according to the present invention. In FIG. 1, numeral 11 denotes a main central processing unit (hereinafter referred to as main CPU). The main CPU 11 is connected, through a bus 21, to a data memory 12, program memory 13, console interface 14, monitor interface 15, frame memory 16, image processor 17, camera interface 18, communication interface 19, and SCSI (small computer system interface) 20, these elements constituting an image processing apparatus 10 as a whole.

The data memory 12, which is formed of a nonvolatile RAM, is stored with teaching data and various other data for image processing. The program memory 13 is loaded with application programs created by users. The console interface 14 is connected to a console 23. The console 23 is provided with various command keys and ten-keys, by means of which are performed operations for data setting and entry, editing, registration, execution, etc. of the application programs. Further, the console 23 is provided with a display screen, on which the contents of commands and operations, menus for data setting, program list, etc. can be displayed.

The monitor interface 15 is connected to a monitor TV to display an image stored in the frame memory 16 and a live image picked up by a camera 22. The frame memory 16 is loaded with pixel data of an object photographed by 22, and the data will be processed as a gray scale image. This pixel data is based on a sensor coordinate system. The image processor 17 processes the image stored in the frame memory 16, thereby identifying the object and detecting the position and attitude thereof.

The camera interface 19 is connected to the camera 22, which is used to photograph objects successively fed onto a production line. The communication interface 19 is connected to a system (not shown) such as a robot, which utilizes a visual sensor system.

Although the above arrangement is similar to that of a conventional visual sensor, the present invention is characterized particularly by that the designed image processing can be executed by using the visual sensor to which an auxiliary storage device as an external memory is attached through the medium of the SCSI 20. More specifically, the SCSI 20 is connected to a photomagnetic disk device as the auxiliary storage device 25. The auxiliary storage device 25 is not limited to the photomagnetic disk device, and may be of a hard disk, optical disk, or other storage device as far as they are capable of writing and reading the data at speeds which are equally as high as the photomagnetic device. Alternatively, a cassette streamer, DAT (digital audio tape recorder), or other storage device in which data are written and read at lower speeds may be used. Any of these storage devices has a storage capacity of several megabytes or more, and can store several thousand to ten thousand image data or more. With the high-speed storage device, in particular, the data can be stored almost simultaneously with the execution of the image processing.

Figure 2:
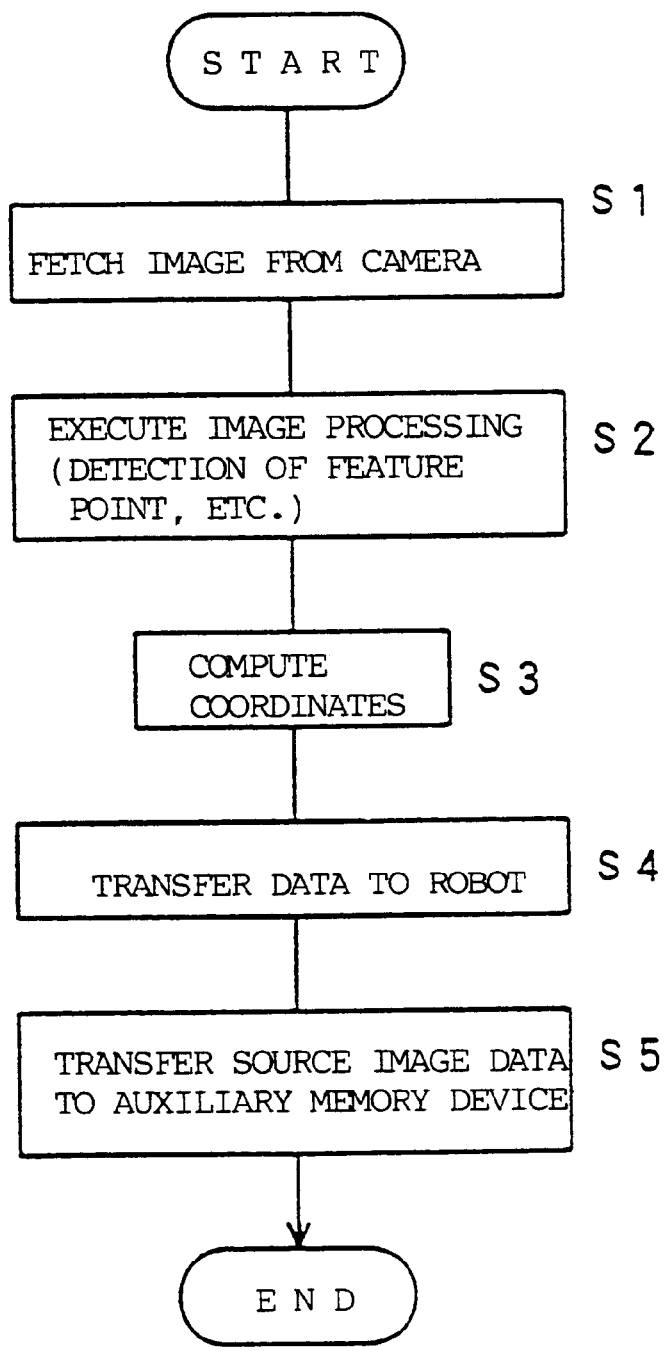
FIG. 2 is a flow chart showing the operation of the one embodiment of the method of the present invention.

Referring now to the flow chart of FIG. 2, the operation of the present embodiment will be described. When an image processing start command is externally inputted through the communication interface 19, the main CPU 11 starts an image processing program stored in the program memory 13, whereupon an image snap command is first delivered to the camera 22 through the camera interface 18. An image picked up by the camera 22 is loaded into the frame memory 16 after undergoing the processing for gray scale shading by means of the image processor 17 (Step S1). Then, the main CPU 11 issues an object detection command to the image processor 17. Thereupon, in response to this command, the image processor 17 executes image processing by using teaching data previously obtained for the image stored in the frame memory 16, thereby identifying the object and detecting the position and attitude thereof (Step S2).

After executing the image processing in this manner, the data of the detected position and attitude of the object as the data of the coordinate system of the visual sensor is transformed to the data of a robot coordinate system (Step S3), and the transformed informations as correction data are transmitted to the robot through the communication interface 19 (Step S4).

On the other hand, each time the image data (source image data) is picked up by the camera and stored in the frame memory 16, the image data are successively transferred through the SCSI 20 to the auxiliary storage device 25 to be stored therein (Step S5). As each source image data is thus stored in the auxiliary storage device 25, informations based on the program used for the image processing, such as a flag for the image processing program, date, serial number, actually detected value, correction data, calibration data, etc., are annexed. If the visual sensor includes a plurality of cameras, the identification numbers of the cameras used to fetch the image are also annexed. In the case of unsuccessful processing, such as a failure in detection, an indication of this failure is also annexed. These annexed pieces information are automatically annexed to the source image data by means of the main CPU 11 in accordance with the processing program previously stored in the program memory 13.

Then, in order to examine whether the established teaching data for the image processing, which has been executed, is appropriate, or examine the cause of the detection failure, by interrupting the operation of the production line which has been in operation, the image input source is switched from the camera 22 to the auxiliary storage device 25 by inputting the change command through the operator console 23.

Thereupon, the operator first causes the menus of the data to be invoked from the auxiliary storage device to be displayed on the screen of the console 23, and selects one of the menus by operating keys, thereby successively invoking undetectable or wrongly detected image data to the frame memory 16. For these image data, the image processor 17 successively executes preprocessings such as gray scale shading, image vignetting, edge emphasizing, etc., and then executes the image processing program again. Observing the result on the monitor TV 24, the operator examines the cause of the failure in the object detection.

Subsequently, another of the menus on the screen of the console 23 is selected, whereby successfully normally detected image data of an optional object are invoked one after another to the frame memory 16 from the auxiliary storage device 25. For these image data, the image processor 17 executes the same image processing program as aforesaid in regular succession. The processed image is caused to appear on the monitor TV 24. At the same time, a point (feature data) for specifying the position of the object recognized by the visual sensor is displayed on the image on the monitor TV 24. When the visual sensor is used to recognize a hole in an article, for example, a cross, corresponding to the center of the hole reconginzed by the visual sensor, is displayed on the image of the object displayed on the monitor TV 24. Then, the operator determines whether the image processing has been properly executed or not by observing the image of the object on the monitor TV 24, and whether or not the feature data has been correctly fetched by the usual sensor by observing the relationship between the object and the cross, that is, by observing whether or not the cross is always positioned accurately in the center of the hole, or whether or not the center point of the small fluctuation of the cross, if any and if fluctuating in various directions, coincides with the center of the hole. If no satisfactory result is obtained, the operator starts operation for modifying teaching data. Then, the operator establishes (tentatively) new teaching data by means of the console 23. Thereupon, the data is loaded into the data memory 12. Subsequently, the operator transfers the source image data again from the auxiliary storage device 25 to the frame memory 16 through key operation on the console 23. This image data will be processed according to the image processing program based on the modified teaching data, and the result is caused to appear on the monitor TV 24. Then, the operator examines whether or not the cross is situated in the center of the hole in the object or the image on the monitor TV 24, and repeats the operation for modifying the teaching data by trial and error until a satisfactory result is obtained.

Thus, the cause of the detection failure can be examined for the past image processing, and whether the established teaching data is optimum or not can also be examined afterwards even for the normally detected image data. In like manner, whether or not the correction data is properly computed can be examined by using the stored detected data and the like.

In the embodiment described above, all the images picked up by the camera 22 are stored in the auxiliary storage device 25. Alternatively, however, the auxiliary storage device 25 may be designed so that it stores all of those images which have failed to be detected and some of the normally detected images at regular intervals.

What is claimed is:

1. An image processing method for examining images of a plurality of objects obtained by an industrial visual sensor the plurality of objects being articles which are processed industrially, comprising:

detecting a plurality of image data by an image input device of said plurality of objects on a production line at a current time;

loading a frame memory with said plurality of current image data;

processing the image data in accordance with a processing program;

reading the plurality of current image data from the frame memory;

annexing identification data to the read plurality of current image data in according with said processing program to produce a plurality of identified image data;

successively transferring the plurality of identified image data from the frame memory to an auxiliary storage device and storing said transferred plurality of identified image data in the auxiliary storage device as a plurality of past image data;

subsequently transferring past image identified as corresponding to unsuccessful detection and stored in the auxiliary storage device from the auxiliary storage device to the frame memory;

selectively executing preprocessing on, and processing by the processing program, the past image data corresponding to the unsuccessfully detected images transferred to the frame memory;

displaying a result of the selective preprocessing and the processing of the past image data corresponding to the unsuccessfully detected images on a monitor; and examining by an operator on the monitor the past image data to determine a cause of failure of object detection.

2. An image processing method for examining images of a plurality of objects obtained by an industrial visual sensor installed in an industrial environment, the plurality of objects being articles which are processed industrially according to claim 1, wherein said identification data include at least one of: data for specifying said image data, a detected value for the image data, a program name, calibration data, and correction data.

3. An image processing method for examining images of a plurality of objects obtained by an industrial visual sensor installed in an industrial environment, the plurality of objects being articles which are processed industrially according to claim 2, wherein said identification data including information of an image input device used to detect the image data is further annexed as said identiciation data when the visual sensor includes a plurality of cameras.

4. An image processing method for examining images of a plurality of objects obtained by an industrial visual sensor the plurality of objects being articles which are processed industrially according to claim 2, wherein identification data indicative of unsuccessful processing, such as a failure in detection is further annexed as said identification data.

5. An image processing method for examining images of a plurality of objects obtained by an industrial visual sensor installed in an industrial environment, the plurality of objects being articles which are processed industrially according to claim 1, wherein said auxiliary storage device is a large-capacity storage device such as an optical disk, photomagnetic disk, hard disk, cassette streamer or DAT.

6. An image processing method for examining images of a plurality of objects obtained by an industrial visual sensor installed in an industrial environment, the plurality of objects being articles which are processed industrially according to claim 1, wherein said image data stored in the frame memory of unsuccessful detection are transferred to said auxiliary storage device for storage, while the successfully detected image data are thinned out in a predetermined process before being transferred and stored in said auxiliary storage device.

7. An image processing method for examining images of a plurality of objects obtained by an industrial visual sensor installed in an industrial environment, the plurality of objects being articles which are processed industrially, comprising the steps of:

loading a frame memory with a plurality of current image data of said plurality of objects on a production line detected by an image input device at a current time;

processing the image data in accordance with a processing program;

reading the current image data from the frame memory;

annexing identification data to the read image data in accordance with said processing program to produce identified image data;

successively transferring and storing the identified image data from the frame memory to an auxiliary storage device as a plurality of past image data;

restoring the plurality of past image data stored in said auxiliary storage device to said frame memory after a current operation is completed and said production line is stopped;

displaying the restored plurality of past image data restored in the frame memory;

executing the processing program based on the restored plurality of past image data in order to evaluate the restored plurality of past image data;

determining whether the restored plurality of past image data detects an object; and examining by an operator on a monitor a cause of failure of detection of an object based upon the executing of the image processing program on the restored plurality of past image data displayed on the monitor.

8. An image processing method for examining images of a plurality of objects obtained by an industrial visual sensor installed in an industrial environment, the plurality of objects being articles which are processed industrially according to claim 7, wherein said identification data include at least one of: data for specifying said image data, a detected value for the image data, a program name, calibration data, and correction data.

9. An image processing method for examining images of a plurality of objects obtained by an industrial visual sensor installed in an industrial environment, the plurality of objects being articles which are processed industrially according to claim 7, wherein said auxiliary storage device is a large-capacity storage device such as an optical disk, photomagnetic disk, hard disk, cassette streamer or DAT.

10. An image processing method for examining images of a plurality of objects obtained by an industrial visual sensor installed in an industrial environment, the plurality of objects being articles which are processed industrially according to claim 7, wherein said image data stored in the frame memory of unsuccessful detection are transferred to said auxiliary storage device for storage, while the successfully detected image data are thinned out in a predetermined process before being transferred and stored in said auxiliary storage.

11. An image processing method for examining images of objects obtained by a visual sensor installed in an industrial environment, the objects being articles which are processed industrially, comprising the steps of:

loading a frame memory with image data of said objects detected by said visual sensor on a production line;

reading the image data from the frame memory;

annexing identification data to the read image data and transferring to and storing the resulting data in an auxiliary storage device so as to store therein image data of a plurality of object images;

subsequently transferring the image data stored in said auxiliary storage device from said auxiliary storage device to said frame memory for the examination of said transferred past image data in dependence upon a selection of an image made with reference to relevant identification data annexed to the image data, the selected image being displayed on a screen and the corresponding image data being subjected to reproductive execution by an appropriate image processing program selected in dependence upon the identification data associated with the image, whereby the image of an object is reviewed subsequently in order to investigate that image.

12. An image processing method for examining images of objects obtained by a visual sensor installed in an industrial environment, the objects being articles which are processed industrially according to claim 11, wherein said auxiliary storage device is a large-capacity storage device such as an optical disk, photomagnetic disk, hard disk, cassette streamer or DAT.

13. An image processing method for examining images of objects obtained by a visual sensor installed in an industrial environment, the objects being articles which are processed industrially according to claim 11, wherein said identification data include at least one of: data for specifying said image data, a detected value for the image data, a program name, calibration data, and correction data.

14. An image processing method for examining images of objects obtained by a visual sensor installed in an industrial environment, the objects being articles which are processed industrially according to claim 11, wherein identification data indicative of unsuccessful processing, such as a failure in detection, if any, is further annexed as said identification data.

* * * * *